United States Patent [19]

Miller

[11] Patent Number: 4,610,560
[45] Date of Patent: Sep. 9, 1986

[54] PANEL DISPLAY CONNECTOR

[75] Inventor: Melvin M. Miller, Bloomington, Ind.

[73] Assignee: Channel-KOR Systems Inc., Bloomington, Ind.

[21] Appl. No.: 582,488

[22] Filed: Feb. 22, 1984

[51] Int. Cl.[4] ............................................. F16C 11/04
[52] U.S. Cl. .................................... 403/119; 403/297; 403/362; 403/405.1; 16/366; 160/229 R; 211/189
[58] Field of Search ............... 403/405, 297, 362, 119; 160/135, 351, 229 R; 16/366; 256/26; 211/189; 312/114, 140

[56] References Cited

U.S. PATENT DOCUMENTS

| 1,025,759 | 5/1912  | McCloskey | 403/362 X |
| 3,247,891 | 4/1966  | Sadoff    | 160/229 R |
| 3,662,807 | 5/1972  | Miller    | 160/135   |
| 3,847,489 | 11/1974 | Van Riper | 403/405 X |
| 3,900,269 | 8/1975  | Paulot    | 403/292   |
| 4,496,263 | 1/1985  | Laarhoven | 403/405 X |

FOREIGN PATENT DOCUMENTS

| 1313182 | 11/1962 | France         | 160/135 |
| 1542245 | 3/1979  | United Kingdom | 16/366  |

Primary Examiner—Cornelius J. Husar
Assistant Examiner—Joseph A. Fischetti
Attorney, Agent, or Firm—Donald R. Bahr

[57] ABSTRACT

This invention relates to connector systems for portable display devices. The connectors of this invention allow adjoining panels of the display device to be joined to each other and be moved in pivotal relationship with each other. The connector consists of a male member which is secured to a channel which is an integral part of the display device and a connector plate which joins two or more channels together. When the channels are joined using the connector of this invention, the channels and their associated display panels may be pivotally disposed in relationship to each other.

1 Claim, 6 Drawing Figures

PANEL DISPLAY CONNECTOR

BACKGROUND OF THE INVENTION

This invention is concerned with display devices of the portable type which are used, for example, to display information at trade shows or conventions. Display devices as may be used at trade shows or conventions are of two principal types, these being the large bulky type and the portable type. This invention is concerned with the portable type of display device. The portable display devices have become very popular in recent years for utilization at regional trade shows and conventions. These portable display devices, when assembled, present a nice impression and have a very high display sur-face-to-weight ratio. Further, these portable display devices are advantageous in that they can be quickly and easily assembled and disassembled without tools by one person. In contrast, the large bulky display devices as mentioned above are very heavy and hence have a low display surface-to-weight ratio. Further, these display devices can be assembled and disassembled only with great difficulty by extra workman at great expense.

The subject invention is useful in connection with portable display devices wherein a plurality of display panels are attached to channels which in turn function as supporting means. It is often desirable to connect more than one display device in angular relationship with each other. It is in this area where the subject invention is useful.

Display devices of the type which are useful in connection with this invention are the subject of U.S. Pat. No. 3,662,807.

The connector system of this invention is also useful in holding component parts of a display device in fixed relationship with each other. For example, this invention can be used to position header panels in fixed relationship with a display device.

DESCRIPTION OF THE PREFERRED EMBODIMENT

Figure 1:
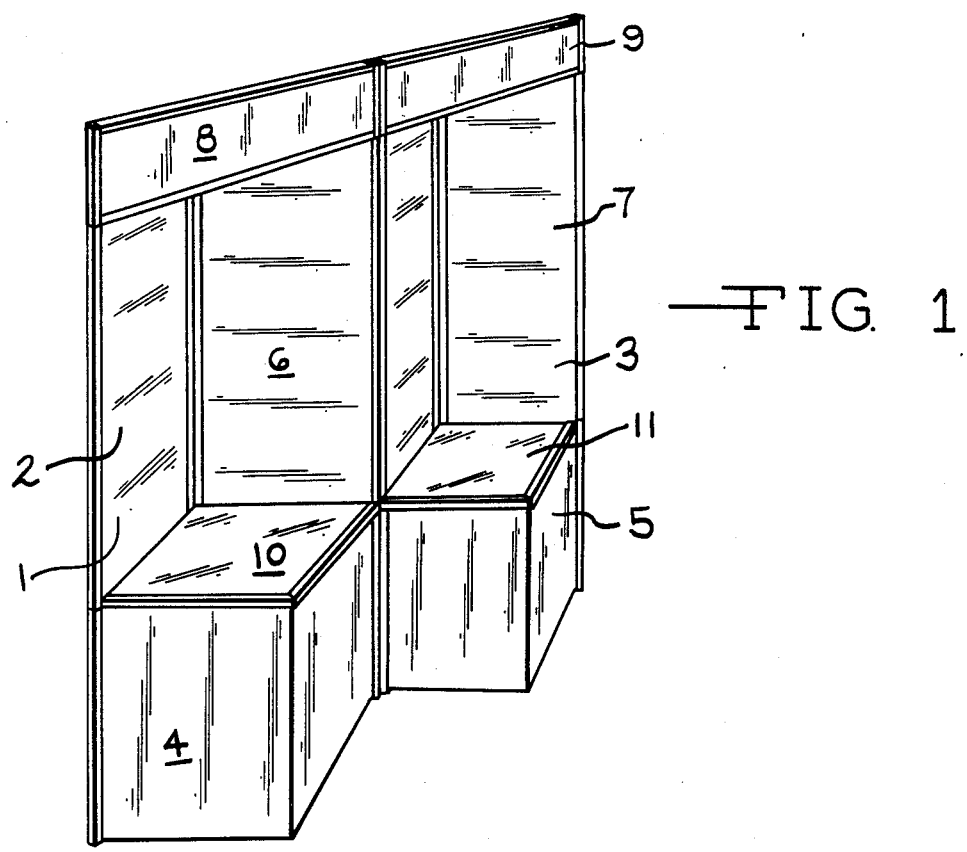
FIG. 1 is a perspective view of a finished display device which utilizes the subject invention.

Referring to FIG. 1 it can be seen that the display device 1 which utilizes the connector system of this invention incorporates two distinct displays 2 and 3. Displays 2 and 3 are free standing and hence may be used separately. Using the connector of this invention, it is possible to connect two or more displays such as displays 2 and 3 together. Once these displays are connected together, they may be angularly disposed in relationship to each other.

It should be noted that while specific displays 2 and 3 are illustrated it is understood by one skilled in the art that this invention can be used with displays that assume any convenient shape. That is, utilization of the connector system of this invention is not limited to the displays as are illustrated in FIG. 1.

Figure 2:
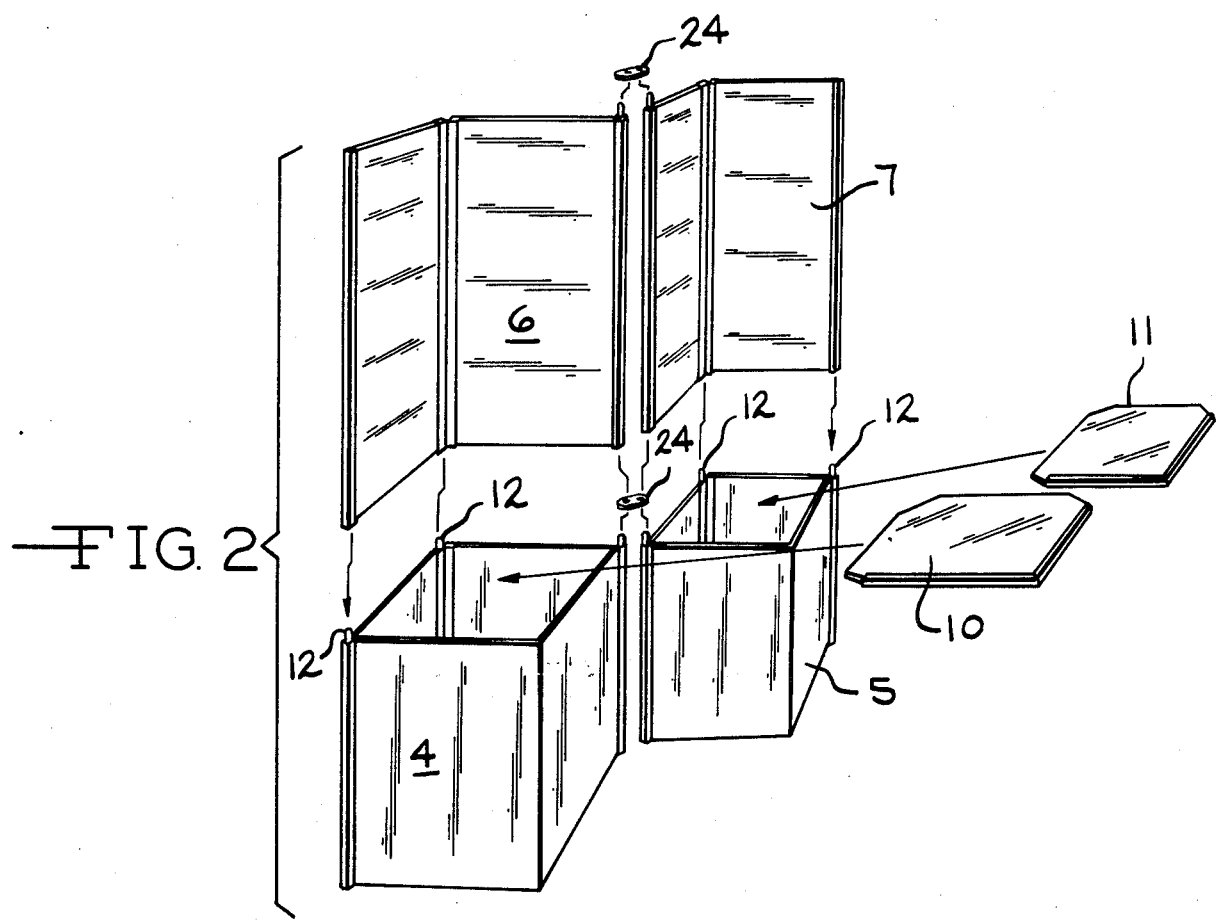
FIG. 2 is a perspective view of a display device which utilizes the subject invention wherein the component parts of the display device are in a spaced apart relationship.

Displays 2 and 3 incorporate respectively base sections 4 and 5, display areas 6 and 7, horizontal sections 10 and 11 and header sections 8 and 9. These various component parts are separable from each other as is illustrated in FIG. 2.

Further, these components may be collapsed in such a manner that it occupies little room and hence the folded structure is suitable for shipment or storage. As can further be seen from FIG. 2, displays 2 and 3 are connected to each other by a pair of connector plates 24 which are secured to the uppermost abutting edges of base sections 4 and 5 and display areas 6 and 7.

Further, display sections 6 and 7 are secured to base sections 4 and 5 via connector plugs 12.

Figure 3:
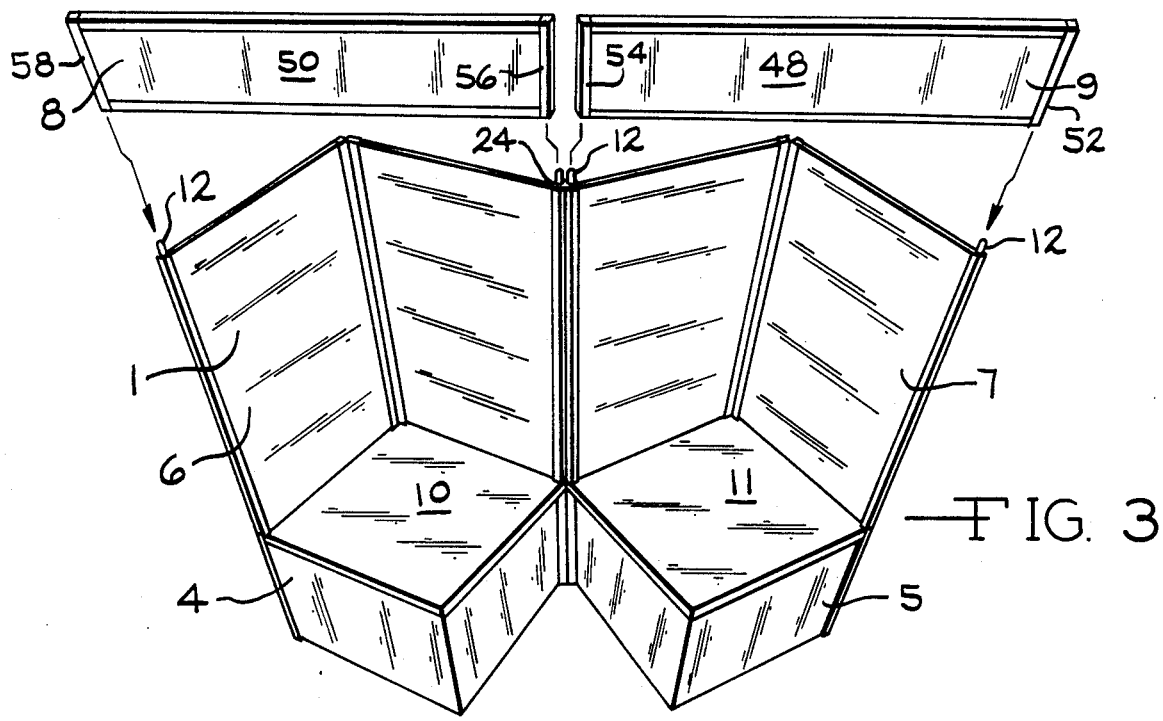
FIG. 3 is a perspective view showing the use of this invention to secure header panels to a display device.

FIG. 3 further illustrates the relationship of the component parts and the further addition of header sections 8 and 9 to display areas 6 and 7 by the utilization of a plurality of connector plugs 12.

Figure 4:
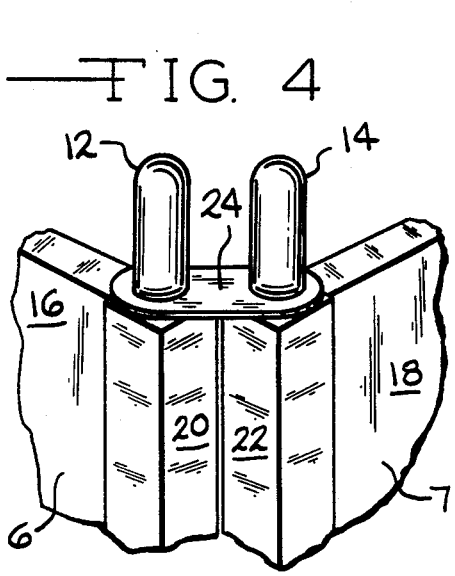
FIGS. 4 and 5 are perspective views showing the assembly of the male and female component parts of the connector of this invention.
Figure 5:
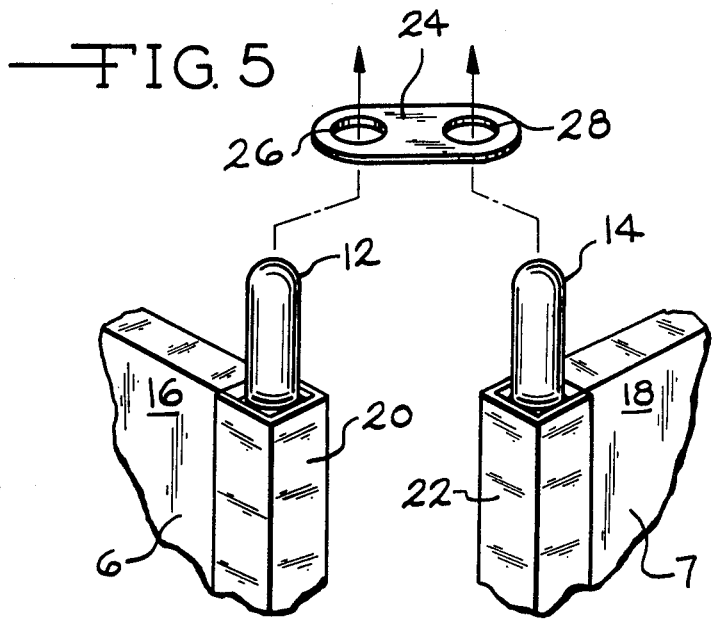
Figure 6:
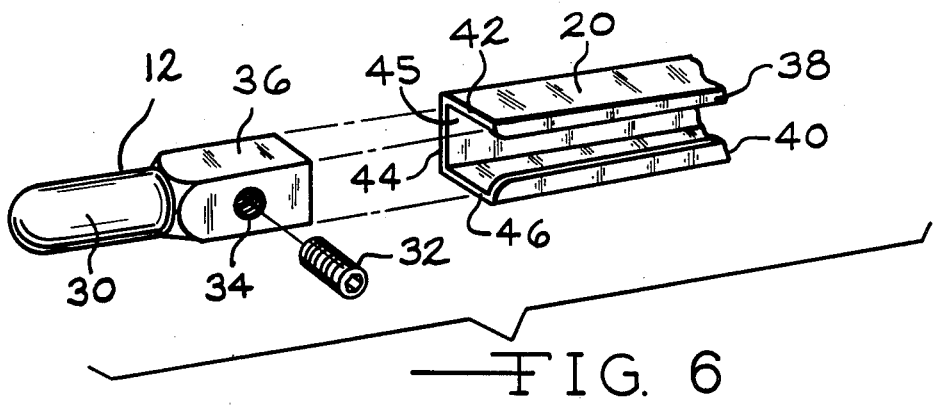
FIG. 6 is a perspective view showing the attachment of the male component of the connector of this invention to the display channel.

FIGS. 4, 5 and 6 illustrate in greater detail connector plugs 12 and its utilization with channel 20. Channel 20 is formed by three side areas 42, 44 and 46. The fourth side of channel 20 is essentially open; however, this side incorporates a pair of opposing lips 38 and 40. Sides 42, 44, 46 and lips 38 and 40 define an opening 45. Opening 45 is adapted to receive panel sections 16 and 18. The ends of these panel sections may be slightly notched so as to allow room for ends 30 and 36 of connector plug 12.

Connector plug 12 incorporates a square end 36 and a round end 30. Square end 36 further incorporates a threaded aperture 34 which is adapted to receive set screw 32. Square end 36 of connector plug 12 is positioned in aperture 45 of channel 20 and is secured in place by the tightening of set screw 32. Square end 36 is of such a size that it just fits into opening 45 of channel 20.

Round end 30 is likewise of such a diameter that it just fits into opening 45 of channel 20. Channel 20 is also used in the other component parts of composite display 1; for example, on header sections 8 and 9 as is illustrated in FIG. 3. Header sections 8 and 9 incorporates panel sections 48 and 50 which have notched corners such as to allow round end 30 of connector plugs 12 room to slip into channels 52, 54, 56 and 58.

In order to connect displays 2 and 3, connector plate 24 is further provided as is illustrated in FIGS. 4 and 5. Connector plate 24 incorporates a pair of opposing apertures 26 and 28, the diameter of which is just slightly larger than the diameter of round end 30 of connector plug 12.

As is illustrated in detail in FIGS. 4 and 5, connector plate 24 is placed over a pair of connector plugs 12 and 14 which are in turn secured in channels 20 and 22. These channels may be pivoted in relationship to each other as a result of the pivotal relationship of connector plugs in apertures 26 and 28 of connector plate 24. Since channels 20 and 22 may be pivoted in relationship to each other, displays 2 and 3 are likewise pivoted in relationship to each other as channels 20 and 22 are an integral part of displays 2 and 3.

As was mentioned above, square end 36 of connector plug 12 may be secured in channel 20 by a set screw 32.

However, other means may be utilized to secure connector plug 12 in channel 20. For example, square end 36 may be glued in channel 20. Likewise, other mechanical means may be used in lieu of set screw 32 to bias square end 36 of connector plug 12 against lips 38 and 40 of channel 20.

Connector plug 12 and connector plate 24 can be manufactured from any suitable material such as a metal or a polymeric material. However, in accordance with the preferred embodiment these components parts are manufactured from an injection molded thermoplastic material such as a nylon.

Various modifications can be made to the above-described embodiments without departing from the intended scope of the present invention. The above disclosure incorporates a latitude of modification, change and substitution. Some features of the invention as described above can be used without use of other features. Therefore, it is appropriate that the appended claims be construed broadly and in a manner consistent with the spirit and scope of the subject matter.

What is claimed is:

1. A display device connector system comprising a plurality of U-shaped channels which support the display, connector plugs which are locked into the uppermost ends of said U-shaped channels and a connector plate having a plurality of apertures therein, said apertures are adapted to receive connector plugs which are positioned in outboard U-shaped channels of adjacent displays;

said display device comprises at least two base sections and at least two display sections, which are positioned on top of said base sections;

said U-shaped channels have inner surfaces which incorporate three sides and a pair of opposing lips which define a rectangular aperture;

said connector plugs have a round end and a rectangular end with a threaded bore therein for receiving a set screw which biases said plug member against said pair of opposing lips, the rectangular ends of said connector plugs being secured into said U-shaped sections;

the uppermost portion of the U-shaped channels incorporated in the base sections have connector plugs secured therein which connector plugs are adapted to receive corresponding U-shaped channels which are an integral pat of the display section;

wherein adjacent base sections and display sections are secured to each other via connector plates the apertures of which are positioned over the round end of said connector plugs.

* * * * *